Oct. 11, 1938.  W. H. BASELT  2,133,242
BRAKE ARRANGEMENT
Filed Jan. 23, 1935  2 Sheets—Sheet 1
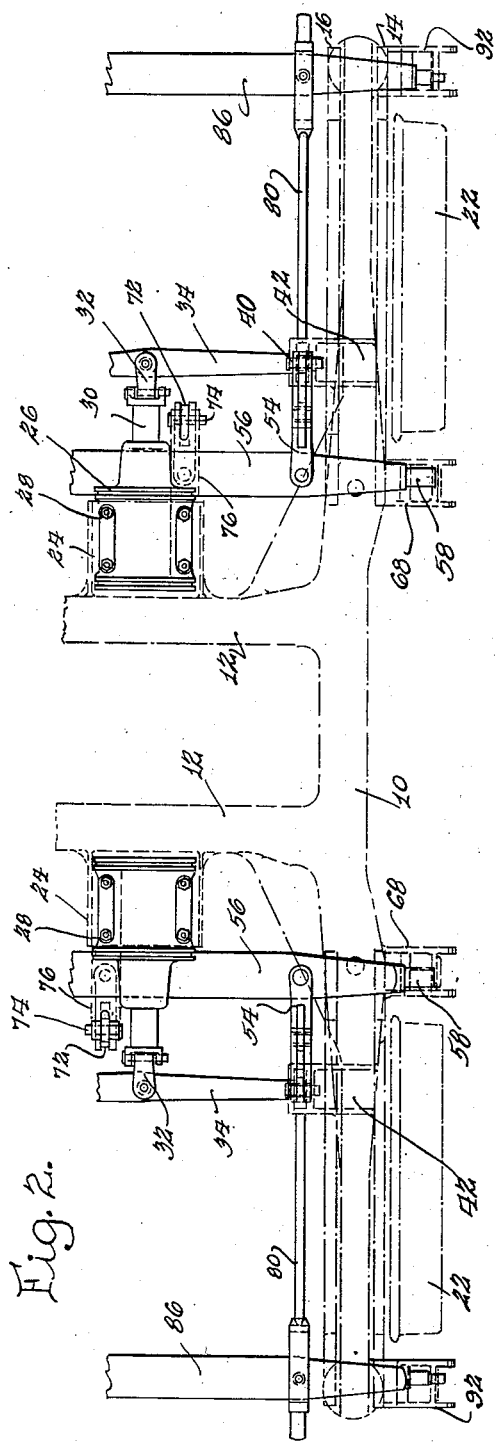
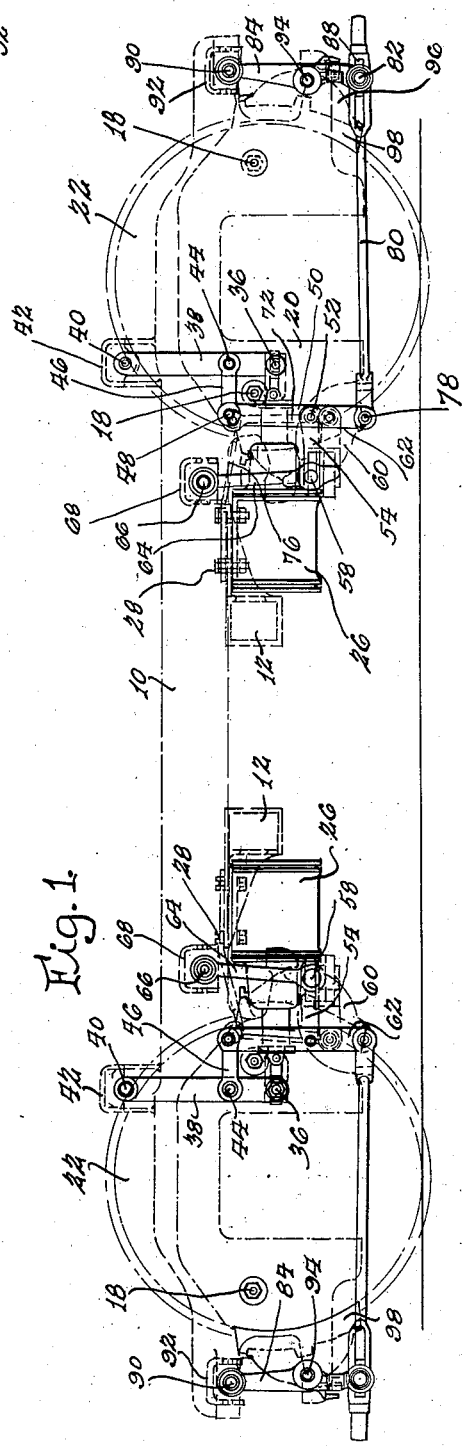

Oct. 11, 1938.    W. H. BASELT    2,133,242
BRAKE ARRANGEMENT
Filed Jan. 23, 1935    2 Sheets-Sheet 2

Inventor:-
Walter H. Baselt
By:- Wilkinson, Huxley, Byron & Knight
attys

Patented Oct. 11, 1938

2,133,242

UNITED STATES PATENT OFFICE 2,133,242

BRAKE ARRANGEMENT

Walter H. Baselt, Chicago, Ill., assignor to American Steel Foundries, Chicago, Ill., a corporation of New Jersey Application January 23, 1935, Serial No. 3,114

34 Claims. (Cl. 188—56)

This invention pertains to car trucks, and more particularly to a unit cylinder clasp brake arrangement for high speed articulated trailer trucks.

It is an object of this invention to provide a four wheel truck for use with high speed articulated trains wherein a pair of cylinders is used to operate clasp brakes provided on said truck.

Another object of the invention is to provide a brake arrangement for a low center of gravity truck wherein unit cylinder brake operating means is utilized.

Yet another object is to provide a brake arrangement adapted for use on trains of the high speed type wherein positive and effective braking must be provided.

A further object is to provide a four wheel inboard truck having low sills and integral connecting transoms, the transoms supporting between the sills operating cylinders for the wheel brakes.

Yet a further object is to provide clasp brakes for a car truck, the brakes for each wheel and axle assembly being operated by unit cylinder means provided on the truck between the spaced wheels of each wheel and axle assembly.

A different object is to provide an equilizer for each wheel and axle assembly of a truck, the equalizer being supported on the truck and operated intermediate its ends by a cylinder carried by the truck, the equalizer for each wheel and axle assembly being operatively connected to clasp brakes for the wheels.

A still different object is to provide a brake system for a truck, carried by said truck, the truck being supported through resiliently mounted wing castings on the wheel and axle assemblies.

Another different object is to provide brakes for a high speed type of inboard truck which fulfill all conditions of manufacture and service, and are inexpensive to make and maintain.

With these and various other objects in view, the invention may consist of certain novel features of construction and operation, as will be more fully described and particularly pointed out in the specification, drawings and claims appended hereto.

In the drawings, which illustrate an embodiment of the device and wherein like reference characters are used to designate like parts—

Figure 1 is a side elevation of a high speed type of four wheel truck having applied thereto a brake arrangement embodying the invention;

Figure 2 is a fragmentary top plan view of the truck and brake arrangement illustrated in Figure 1;

Figure 3:
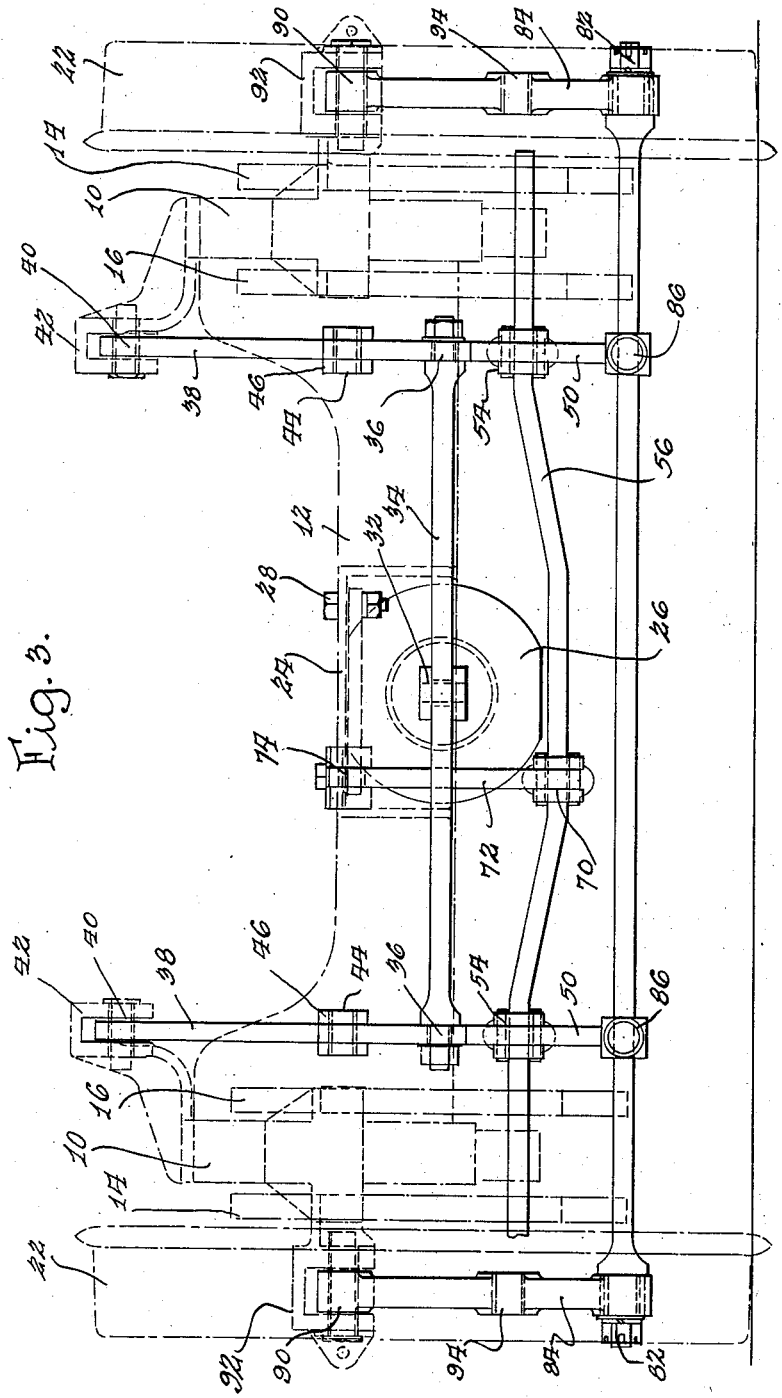
Figure 3 is an enlarged end elevation of the truck and brake arrangement, the same being taken at the right end of said truck as viewed in Figures 1 and 2.

The truck illustrated consists essentially of the truck side frame or side rails 10, the side frames on each side of the truck being spaced apart and integrally connected by means of the spaced transoms 12 which are adapted to carry the usual bolster in the conventional manner. The truck is of the inboard type and is provided at the ends of said side frames with inner and outer wing castings 14 and 16 secured as at 18 to the side frame adjacent the jaws 20, through rubber washers or rubber "doughnuts" provided between the wing castings and side frames to form a resilient cushion between said wing castings and side frames.

The wing castings are formed with jaws adapted to engage journal means (not shown) received in the jaws 20, said journal means cooperating with the wheel and axle assemblies 22. By the provision of wing castings and the rubber cushion, a resilient cushion is provided between the wheel and axle assemblies and side frame, permitting relative movement therebetween, such as angling when the truck is negotiating curves and that movement which is necessary for the cushions to absorb road shocks.

Where clasp brakes are contemplated, as in the present truck, the brakes and operating means may be carried directly by the side frame, and to this end the transoms 12 are provided with the integral brackets 24 disposed adjacent the longitudinal center line of the truck. As the brake arrangements are the same for each end of the truck, that is, for each of the wheel and axle assemblies, the same designation will be used for corresponding parts of the brake rigging at each end of the truck.

The brake cylinder 26 is secured as at 28 to the bracket 24 below said bracket, the brake cylinder being provided with the piston 30 operating toward the adjacent end of the truck. The piston 30 is pivotally connected as at 32 to the equalizer 34 adjacent the center of said equalizer for substantially universal movement with respect thereto. The end of said equalizer is pivotally connected as at 36 to the lower end of the vertically disposed dead lever 38. The upper end of said dead lever 38 is pivotally connected as at 40 to the bracket 42 provided on the side rail, said bracket extending inwardly of said side rail.

The dead lever 38 is pivotally connected as at 44 intermediate the ends thereof, and as shown, near the lower end thereof to the link 46. The other end of said link 46 is pivotally connected as at 48 to the upper end of the vertically disposed live truck lever 50. The live lever 50 is connected as at 52 to the fulcrum 54 of the brake beam 56, the outer end of said brake beam being pivotally connected as at 58 to the inner brake head 60 provided with the usual brake shoe 62, the brake beam being offset downwardly to afford clearance at the brake cylinder. The brake beam 56 is pivotally connected as at 58 to the hanger 64 which supports the brake beam from the truck side frame, said hanger being pivotally connected as at 66 to the bracket 68 preferably integrally provided on the side of the side frame. The brake beam 56, which is offset downwardly adjacent the center thereof and out of the way of the cylinder 26, is pivotally connected at at 70 to the balance hanger 72 which is pivotally connected as at 74 to the bracket 76 attached to the brake cylinder bracket 24, or to the transom.

The lower end of the live lever 50 is pivotally connected at 78 to the pull rod or slack adjuster rod 80, said rod extending below the axle and being pivotally connected as at 82 to the lower end of the hanger lever 84 and to the hanger lever connector 86, the outer end of said pull rod being provided with the slack adjuster 88 at said connection 82. The upper end of the hanger lever 84 is pivotally connected as at 90 to the outwardly extending bracket 92, preferably integrally provided on the side frame adjacent the end thereof. The hanger lever 84 is pivotally connected intermediate the ends thereof as at 94 to the outer brake head 96 provided with the brake shoe 98.

With the brake arrangement shown, assuming the brakes to be in inoperative position, and considering, as an example, the application of the brake fluid unit shown at the right of Figures 1 and 2, to the cylinder 26 causes the piston 30 to be moved outwardly or toward the adjacent end of the truck, moving with it the connected equalizer 34. Movement of the equalizer 34 toward the axle or outwardly causes rotation of the dead lever 38 in a counterclockwise direction, whereupon the link 46 causes movement of the upper end of the live lever 50 toward the right, as viewed in Figure 1, thus applying the brake shoe 52 to the periphery of the wheel.

Continued movement of the dead lever 38 causes rotation of the live lever 50 about the pivot 52 to move the pull rod 80 inwardly toward the transverse center line of the truck, thus causing the hanger lever 84 to be moved in a clockwise direction to apply the brake shoe 96 to the periphery of the wheel. As corresponding brake levers are connected on opposite sides of the truck by means of the brake beam 56 and the hanger lever connector 86, the single cylinder for each wheel and axle assembly operates the brake rigging for that wheel and axle assembly, release of the brake fluid causing retraction of the piston, which of course releases the brakes in a direction opposite to the direction of application of said brakes.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a truck, the combination of a truck frame having cross transoms, wheels associated with said truck, brake shoes on opposite sides of each wheel, brake cylinders carried on said truck frame adjacent to and substantially at right angles to said cross transoms, equalizing levers connected at an intermediate point to each of said brake cylinders and at their ends to pairs of levers fulcrumed on said truck frame, and operative connections between said pairs of fulcrum levers and said brake shoes.

2. In a brake arrangement, the combination of a truck having a side frame, a transom integrally connected to said side frame, a wheel and axle assembly disposed in supporting relation to said side frame, a dead truck lever disposed at one side of said wheel and pivotally supported on said frame, a live lever disposed at the opposite side of said wheel, a connection between ends of said dead and live levers, a dead lever connected to said side frame adjacent said live lever, a connection between said live lever and said last named dead lever at a point intermediate the ends of said dead lever, and operating means connected to said last named dead lever.

3. In a brake arrangement, the combination of a truck having a side frame, a transom integrally connected to said side frame, a wheel and axle assembly disposed in supporting relation to said side frame, a dead truck lever disposed at one side of said wheel and pivotally supported on said frame, a live lever disposed at the opposite side of said wheel, a connection between ends of said dead and live levers, a dead lever connected to said side frame adjacent said live lever and a connection between said live lever and said last named dead lever at a point intermediate the ends of said dead lever, and operating means connected to said last named dead lever, said operating means including a cylinder supported on said truck.

4. In a brake arrangement, the combination of a truck having a side frame, a transom integrally connected to said side frame, a wheel and axle assembly disposed in supporting relation to said side frame, a dead truck lever disposed at one side of said wheel and pivotally supported on said frame, a live lever disposed at the opposite side of said wheel, a connection between ends of said dead and live levers, a dead lever connected to said side frame adjacent said live lever and connected to said live lever, and operating means connected to said last named dead lever, said operating means including a cylinder supported on said transom spaced from said side frame.

5. In a brake arrangement, the combination of a truck frame including side frames and spaced transoms integrally connecting said side frames, wheel and axle assemblies supporting said truck frame, a dead truck lever at one side of one of the wheels, a live truck lever adjacent the opposite side of said wheel, a connection between said truck levers below the axle level, an operating cylinder disposed inwardly of said wheel and supported on said truck frame, and a connection between said live lever and the piston of said cylinder, said piston operating toward the adjacent axle.

6. In a brake arrangement, the combination of a truck frame including side frames and spaced transoms integrally connecting said side frames, wheel and axle assemblies supporting said truck frame, a dead truck lever at one side of one of the wheels, a live truck lever adjacent the opposite side of said wheel and in the plane thereof, a connection between said truck levers, a dead lever connected to said live truck lever, an operating cylinder disposed inwardly of said wheel and supported on said truck frame, and a connection between said last named dead truck lever and the piston of said cylinder, said piston operating toward the adjacent axle.

7. In a brake arrangement, the combination of a truck frame including side frames and spaced transoms integrally connecting said side frames, wheel and axle assemblies supporting said truck frame, a dead truck lever at one side of one of the wheels, a live truck lever adjacent the opposite side of said wheel, a connection between said truck levers, a dead lever connected to one of said truck levers and in the plane thereof, a horizontally operating cylinder disposed inboard and inwardly of said wheel and supported on said truck frame, and a connection between said last named dead lever and the piston of said cylinder.

8. In a brake arrangement, the combination of a truck frame including side frames and a connecting transom, wheel and axle assemblies supporting said truck frame, said transom being disposed between said assemblies, truck levers disposed adjacent opposite sides of a wheel, a connection between truck levers, an operating cylinder supported on said transom inwardly of said wheel, and a connection between one of said truck levers and the piston of said cylinder.

9. In a brake arrangement, the combination of a truck frame including side frames and a connecting transom, wheel and axle assemblies supporting said truck frame, said transom being disposed between said assemblies, truck levers disposed adjacent opposite sides of a wheel, a connection between truck levers, an operating cylinder supported on said transom inwardly of said wheel, and a connection between one of said truck levers and the piston of said cylinder, said connection including an equalizer.

10. In a brake arrangement, the combination of a truck frame including side frames and a connecting transom, wheel and axle assemblies supporting said truck frame, truck levers disposed adjacent opposite sides of a wheel and inwardly of the plane thereof, a connection between truck levers, an operating cylinder supported on said transom inwardly of said wheel, and a connection between one of said truck levers and the piston of said cylinder, said connection including an equalizer and a dead lever disposed substantially in the plane of one of said truck levers.

11. In a brake arrangement, the combination of a truck frame including side frames and a connecting transom, wheel and axle assemblies supporting said truck frame, truck levers disposed adjacent opposite sides of a wheel and inwardly of the plane thereof, a connection between truck levers, an operating cylinder supported on said transom inwardly of said wheel, and a connection between one of said truck levers and the piston of said cylinder, said connection including a substantially vertically disposed dead lever.

12. In a brake arrangement, the combination of a truck frame, a wheel and axle assembly disposed in supporting relation to said frame, a truck lever disposed adjacent a wheel and in the plane thereof, a dead lever operatively connected to said truck lever, and an operating cylinder supported on said truck frame inwardly of the wheel and having the piston operatively connected to said truck lever, said piston operating toward the adjacent axle.

13. In a brake arrangement, the combination of a truck frame, a wheel and axle assembly disposed in supporting relation to said frame, a live truck lever disposed adjacent a wheel and inwardly of the plane thereof, a vertically disposed dead lever operatively connected to said truck lever, and an operating cylinder supported on said truck frame inwardly of the wheel and having the piston operatively connected to said truck lever, said piston operating toward the adjacent axle.

14. In a brake arrangement, the combination of a truck frame, a wheel and axle assembly disposed in supporting relation to said frame, a live truck lever disposed adjacent a wheel, a dead lever operatively connected to and being substantially in the plane of said truck lever, and an operating cylinder supported on said truck frame inwardly of the wheel and having the piston operatively connected to said truck lever, said piston operating toward the adjacent axle.

15. In a brake arrangement, the combination of a truck frame, a wheel and axle assembly disposed in supporting relation to said frame, a substantially vertically disposed live truck lever disposed adjacent a wheel, a vertically disposed dead lever operatively connected to said truck lever, and an operating cylinder supported on said truck frame inwardly of the wheel and having the piston operatively connected to said truck lever, said piston operating toward the adjacent axle.

16. In a brake arrangement, the combination of a truck frame, a wheel and axle assembly disposed in supporting relation to said frame, a dead truck lever disposed adjacent a wheel, a dead lever operatively connected to said truck lever, and an operating cylinder supported on said truck frame inwardly of the wheel and having the piston operatively connected to said truck lever through a live truck lever substantially in the plane of said dead lever, said piston operating toward the adjacent axle.

17. In a brake arrangement, the combination of a truck frame, a wheel and axle assembly disposed in supporting relation to said frame, a dead truck lever disposed adjacent a wheel, a vertically disposed dead lever operatively connected to said truck lever, and an operating cylinder supported on said truck frame inwardly of the wheel and having the piston operatively connected to said truck lever through a substantially vertically disposed live truck lever, said piston operating toward the adjacent axle.

18. In a brake arrangement, the combination of a truck frame, a wheel and axle assembly disposed in supporting relation to said frame, a truck lever disposed adjacent a wheel, a dead lever pivotally connected adjacent the upper end thereof to said truck frame and pivotally connected intermediate the ends thereof to said truck lever, said dead lever being disposed in the plane of said truck lever, and an operating cylinder supported on said truck frame and having the piston thereof operatively connected to the lower end of said dead lever.

19. In a brake arrangement, the combination of a truck frame, a wheel and axle assembly disposed in supporting relation to said frame, a truck lever disposed adjacent a wheel, a dead lever pivotally connected adjacent the upper end thereof to said truck frame and pivotally connected intermediate the ends thereof to said truck lever, said dead lever being disposed in the plane of said truck lever, an equalizer connected to the lower end of said dead lever, and an operating cylinder supported on said truck frame inwardly of said wheel and having the piston thereof operatively connected to said equalizer.

20. In a brake arrangement, the combination of a truck frame including spaced side frames and a connecting transom, wheels disposed outboard of each side frame, opposite dead hanger levers connected to the adjacent frames and disposed in the plane of each wheel, a brake beam connecting opposite hanger levers, a brake beam on the opposite sides of said wheels from the first named brake beam, brake hangers disposed in the planes of the respective wheels and pivoted to said side frame and said second named brake beam, a live lever inboard of each wheel, a pull rod connected to said first named brake beam and to the lower end of said live lever, a connection between each live lever intermediate the ends of said lever and to said second named brake beam, a dead lever disposed substantially in the plane of each live lever and pivoted to the adjacent side frame, a connection between the upper end of each live lever and the adjacent dead lever intermediate the ends thereof, an equalizer connecting the lower ends of opposite dead levers, and an operating cylinder supported on said transom intermediate said side frames, the piston of said cylinder being connected to said equalizer.

21. In a brake arrangement, the combination of a truck frame including spaced side frames and a connecting transom, wheels disposed outboard of each side frame, opposite dead hanger levers connected to the adjacent frames and disposed in the plane of each wheel, a brake beam connecting opposite hanger levers, a brake beam on the opposite sides of said wheels from the first named brake beam, brake hangers disposed in the planes of the respective wheels and pivoted to said side frame and said second named brake beam, a live lever inboard of each wheel, a pull rod connected to said first named brake beam and to the lower end of said live lever, a connection between each live lever intermediate the ends of said lever and to said second named brake beam, and means connected to each of said live levers for operating said brake arrangement.

22. In a brake arrangement, the combination of a truck frame including spaced side frames and a connecting transom, wheels disposed outboard of each side frame, opposite dead hanger levers connected to the adjacent frames and disposed in the plane of each wheel, a brake beam connecting opposite hanger levers, a brake beam on the opposite sides of said wheels from the first named brake beam, brake hangers disposed in the planes of the respective wheels and pivoted to said side frame and said second named brake beam, a live lever inboard of each wheel, a pull rod connected to said first named brake beam and to the lower end of said live lever, a connection between each live lever intermediate the ends of said lever and to said second named brake beam, and means connected adjacent the upper end of each of said live levers for operating said brake arrangement.

23. In a brake arrangement, the combination of a truck frame including spaced side frames and a connecting transom, wheels disposed outboard of each side frame, opposite dead hanger levers connected to the adjacent frames and disposed in the plane of each wheel, a brake beam connecting opposite hanger levers, a brake beam on the opposite sides of said wheels from the first named brake beam, brake hangers disposed in the planes of the respective wheels and pivoted to said side frame and said second named brake beam, a live lever inboard of each wheel, a pull rod connected to said first named brake beam and to the lower end of said live lever, a connection between each live lever intermediate the ends of said lever and to said second named brake beam, and means including an equalizer operatively connected to each of said live levers for operating said brake arrangement.

24. In a brake arrangement, the combination of a truck frame including spaced side frames and a connecting transom, wheels disposed outboard of each side frame, opposite dead hanger levers connected to the adjacent frames and disposed in the plane of each wheel, a brake beam connecting opposite hanger levers, a brake beam on the opposite sides of said wheels from the first named brake beam, brake hangers disposed in the planes of the respective wheels and pivoted to said side frame and said second named brake beam, a live lever inboard of each wheel, a pull rod connected to said first named brake beam and to the lower end of said live lever, a connection between each live lever intermediate the ends of said lever and to said second named brake beam, and means including an equalizer operatively connected to the upper end of each of said live levers for operating said brake arrangement.

25. In a brake arrangement, the combination of a truck frame including spaced side frames and a connecting transom, wheels disposed outboard of each side frame, opposite dead hanger levers connected to the adjacent frames and disposed in the plane of each wheel, a brake beam connecting opposite hanger levers, a brake beam on the opposite sides of said wheels from the first named brake beam, brake hangers disposed in the planes of the respective wheels and pivoted to said side frame and said second named brake beam, a live lever inboard of each wheel, a pull rod connected to said first named brake beam and to the lower end of said live lever, a connection between each live lever intermediate the ends of said lever and to said second named brake beam, and an operating cylinder having a piston operatively connected to each of said live levers through an equalizer and a lever.

26. In a brake arrangement, the combination of a truck frame including spaced side frames and a connecting transom, wheels disposed outboard of each side frame, opposite dead hanger levers connected to the adjacent frames and disposed in the plane of each wheel, a brake beam connecting opposite hanger levers, a brake beam on the opposite sides of said wheels from the first named brake beam, brake hangers disposed in the planes of the respective wheels and pivoted to said side frame and said second named brake beam, a live lever inboard of each wheel, a pull rod connected to said first named brake beam and to the lower end of said live lever, a connection between each live lever intermediate the ends of said lever and to said second named brake beam, and an operating cylinder having a piston operatively connected to each of said live levers through an equalizer and a dead lever.

27. In a brake arrangement, the combination of a truck frame including side frames and connecting means therebetween, wheel and axle assemblies supporting said truck frame, truck levers disposed adjacent opposite sides of a wheel, a connection between truck levers, an operating cylinder supported by said truck frame on one side of the axle for said wheel and having a piston operating toward said axle, and means providing a connection on said side of said wheel between said piston and the adjacent truck lever.

28. In a brake arrangement, the combination of a truck frame including side frames and connecting means therebetween, wheel and axle assemblies supporting said truck frame, a live truck lever disposed adjacent one side of a wheel, a dead truck lever disposed adjacent the opposite side of said wheel, a connection between said truck levers, an operating cylinder supported by said truck frame on the said first named side of said wheel and having a piston operating toward said axle, and means providing a connection on said first named side of said wheel between said piston and said live truck lever.

29. In a brake arrangement, the combination of a truck frame including side frames and connecting means therebetween, wheel and axle assemblies supporting said truck frame, truck levers disposed adjacent opposite sides of a wheel, a connection between truck levers, an operating cylinder supported by said truck frame on one side of the axle for said wheel and having a piston operating toward said axle, and means providing a connection on said side of said wheel between said piston and the adjacent truck lever, said means including an equalizer lever.

30. In a brake arrangement, the combination of a truck frame including side frames and connecting means therebetween, wheel and axle assemblies supporting said truck frame, truck levers disposed adjacent opposite sides of a wheel, a connection between truck levers, an operating cylinder supported by said truck frame on one side of the axle for said wheel and having a piston operating toward said axle, and means providing a connection on said side of said wheel between said piston and the adjacent truck lever, said means including an equalizer lever and a dead lever.

31. In a brake arrangement, the combination of a truck frame including side frames and connecting means therebetween, wheel and axle assemblies supporting said truck frame, truck levers disposed adjacent opposite sides of a wheel, a connection between truck levers, an operating cylinder supported by said truck frame on one side of the axle for said wheel and having a piston operating toward said axle, and means providing a connection on said side of said wheel between said piston and the adjacent truck lever, said means including a horizontally disposed equalizer lever and a vertically disposed dead lever.

32. In a brake arrangement, the combination of a truck frame including side frames and connecting means therebetween, wheel and axle assemblies supporting said truck frame, a live truck lever disposed adjacent one side of a wheel, a dead truck lever disposed adjacent the opposite side of said wheel, a connection between said truck levers, an operating cylinder supported by said truck frame on the said first named side of said wheel and having a piston operating toward said axle, and means providing a connection on said first named side of said wheel between said piston and said live truck lever, said means including an equalizer lever.

33. In a brake arrangement, the combination of a truck frame including side frames and connecting means therebetween, wheel and axle assemblies supporting said truck frame, a live truck lever disposed adjacent one side of a wheel, a dead truck lever disposed adjacent the opposite side of said wheel, a connection between said truck levers, an operating cylinder supported by said truck frame on the said first named side of said wheel and having a piston operating toward said axle, and means providing a connection on said first named side of said wheel between said piston and said live truck lever, said means including an equalizer lever and a dead lever.

34. In a brake arrangement, the combination of a truck frame including side frames and connecting means therebetween, wheel and axle assemblies supporting said truck frame, a live truck lever disposed adjacent one side of a wheel, a dead truck lever disposed adjacent the opposite side of said wheel, a connection between said truck levers, an operating cylinder supported by said truck frame on the said first named side of said wheel and having a piston operating toward said axle, and means providing a connection on said first named side of said wheel between said piston and said live truck lever, said means including a horizontally disposed equalizer lever and a vertically disposed dead lever.

WALTER H. BASELT.